(12) United States Patent
Small

(10) Patent No.: US 11,788,158 B2
(45) Date of Patent: Oct. 17, 2023

(54) SYSTEMS AND METHODS FOR STEEL PRODUCTION

(71) Applicant: Pathfinder Holdings Corp., Toronto (CA)

(72) Inventor: James Maurice Small, Fredericton (CA)

(73) Assignee: PATHFINDER HOLDINGS CORP., Toronto (CA)

( * ) Notice: Subject to any disclaimer, the term of this patent is extended or adjusted under 35 U.S.C. 154(b) by 0 days.

(21) Appl. No.: 18/109,649

(22) Filed: Feb. 14, 2023

(65) Prior Publication Data

US 2023/0257838 A1    Aug. 17, 2023

Related U.S. Application Data

(60) Provisional application No. 63/311,337, filed on Feb. 17, 2022.

(51) Int. Cl.
| | | |
|---|---|---|
| C21B 13/00 | (2006.01) | |
| C22C 33/04 | (2006.01) | |
| C21B 11/10 | (2006.01) | |

(52) U.S. Cl.
CPC ........ C21B 13/0006 (2013.01); C21B 11/10 (2013.01); C21B 13/0073 (2013.01); C22C 33/04 (2013.01); C21B 2300/02 (2013.01)

(58) Field of Classification Search
CPC . C21B 13/0006; C21B 11/10; C21B 13/0073; C21B 2300/02; C22C 33/04

USPC ....................................................... 75/10.17
See application file for complete search history.

(56) References Cited

U.S. PATENT DOCUMENTS 5,997,837 A * 12/1999 Lynum ................. C09C 1/48
                                                    423/458
2018/0221947 A1* 8/2018 Reid .................... C21B 13/004

FOREIGN PATENT DOCUMENTS

CN         102031323 A      4/2011

OTHER PUBLICATIONS

An International Search Report and Written Opinion of the International Searching Authority dated Jun. 7, 2023 in connection with PCT/IB2023/051342.

(Continued)

*Primary Examiner* — Brian D Walck
*Assistant Examiner* — Danielle M. Carda
(74) *Attorney, Agent, or Firm* — BAKER AND MCKENZIE LLP

(57) ABSTRACT

The present disclosure relates, according to some embodiments to a method for steel production, the method comprising forming a hydrogen and a carbon from a natural gas using thermal plasma electrolysis; reducing iron ore fines with the $H_2$ to form an iron briquette; melting the briquette iron from the furnace to form a melted iron and melted non-metallic slag; separating the non-metallic slag from the melted iron in the furnace; combining the carbon and the melted iron in a furnace to form a carbon black and iron mixture; and alloying the melted iron with the carbon black to form a steel.

14 Claims, 1 Drawing Sheet

(56) References Cited

OTHER PUBLICATIONS

Advanced Energy Technologies, "Direct Conversion of Methane to Hydrogen by Pyrolysis: Status and Prospects". https://aenert.com/news-events/energy-news-monitoring/hydrogen/n/direct-conversion-of-methane-to-hydrogen-by-pyrolysis-stams-andprospects/, Feb. 17, 2022 (Feb. 17, 2022), [online] [retrieved on Apr. 17, 2023].

G. Petitpas et al., "A comparative study of non-thermal plasma assisted reforming technologies". International Journal Hydrogen Energy, May 23, 2007 (May 23, 2007), vol. 32 (2007), pp. 2848-2867.

* cited by examiner

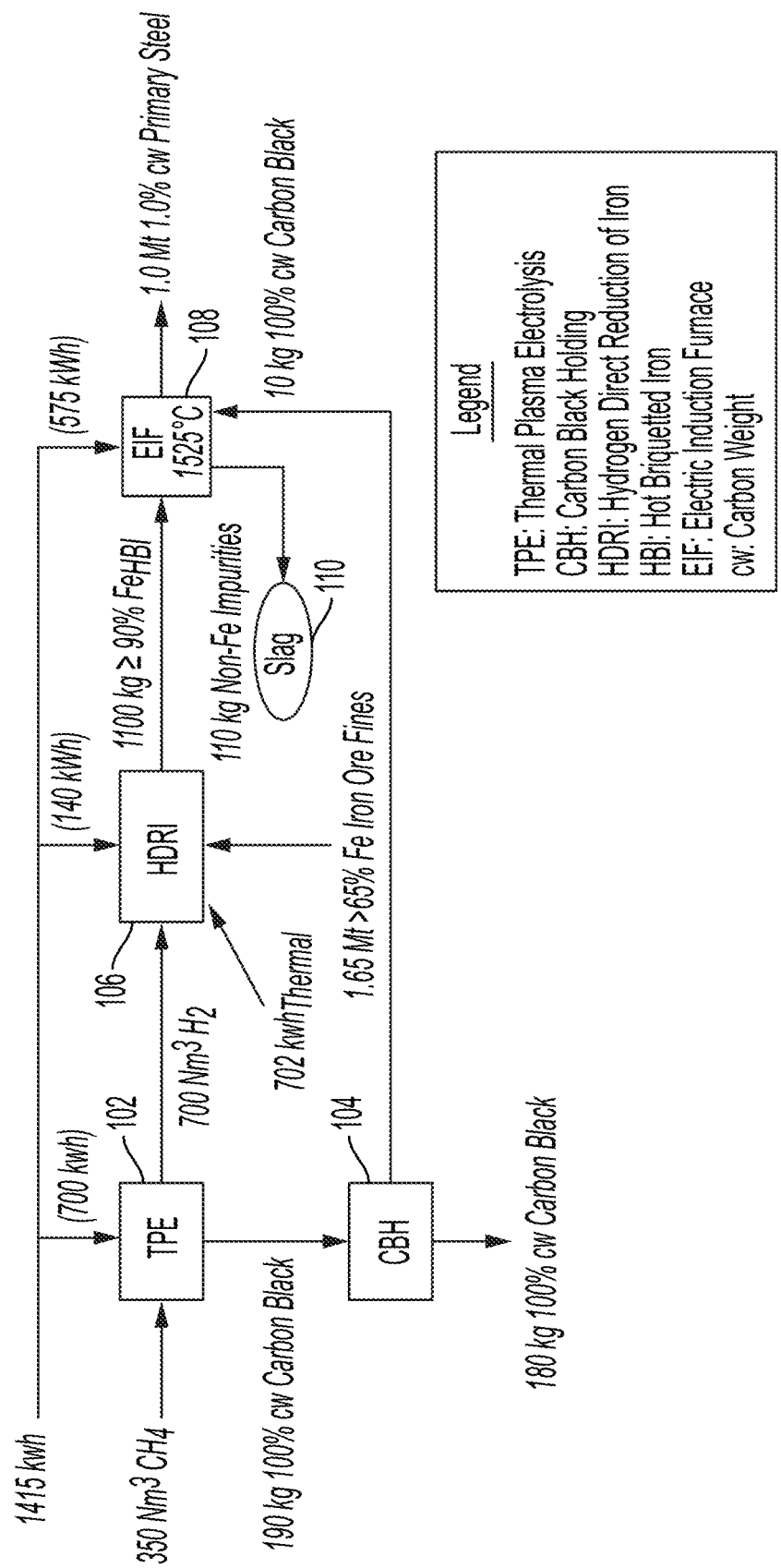

SYSTEMS AND METHODS FOR STEEL PRODUCTION

CROSS REFERENCE TO RELATED APPLICATIONS

This application claims priority to U.S. Provisional Application No. 63/311,337, filed on Feb. 17, 2022, which is incorporated by reference herein in its entirety for all purposes.

FIELD OF THE DISCLOSURE

The present disclosure relates, in some embodiments, to systems and methods of steel production.

BACKGROUND

Conventional methods of producing steel include heating an ore of iron in a furnace in the presence of a coal based fuel (e.g., coke). These methods generate significant amounts of carbon dioxide ($CO_2$) while reducing iron oxide to iron. While producing steel, conventional methods also produce from 1.4 to 1.85 metric tons of $CO_2$ per ton of steel made. In fact, the global steel industry generates about 8% of the global emissions of carbon dioxide ($CO_2$). Therefore, steel plants generate a significant amount of $CO_2$ for steel production purposes. In particular, the major producers of $CO_2$ emissions in a steel plant are the blast furnaces, coke ovens, and sinter and pellet plants used for steel making. A key point of interest in the steel industry is finding ways to drastically reduce overall $CO_2$ emissions.

BRIEF SUMMARY

According to one aspect of the subject matter described in this disclosure, a method or system for steel production is provided. The methods may include the following: forming, using thermal plasma electrolysis, hydrogen ($H_2$) and carbon black from natural gas; forming, using hydrogen direct reduction of pre-heated iron ore fines to form a briquetted iron (e.g., hot briquetted iron); providing the briquetted iron to an electric induction furnace; melting the briquetted iron in the electric induction furnace and removing the non-metallic containing slag; adding the carbon black into the molten iron in the electric induction furnace; and alloying the melted iron with the carbon black to form steel.

The present disclosure relates to methods for steel production. A method may include forming a hydrogen ($H_2$) and a carbon from a natural gas using thermal plasma electrolysis system. The method may include reducing pre-heated iron ore fines with the $H_2$ to form a briquetted iron (e.g., hot briquetted iron) of ≥90% iron content. The method may include melting the briquetted iron and removing the non-metallic bearing slag. The method may include combining the carbon black and the melted iron in a furnace to form a carbon black and iron mixture. The method may include alloying the melted iron with the carbon black to form a steel.

A disclosed method may include reducing pre-heated iron ore fines with the $H_2$ to form briquetted iron of ≥90% iron content. The reducing of the pre-heated iron ore fines is performed with a hydrogen direct reduction system. A carbon may be a carbon black. The method may produce less than about 0.1 metric tons of $CO_2$ per metric ton of steel produced. The method may produce less than about 0.001 metric tons of $CO_2$ per metric ton of steel produced. The steel may include a carbon content ranging from about 0.05 wt. % to 3.0 wt. %, by weight of the steel. The steel may comprise a carbon content of about 1.0 wt. %, by weight of the steel. The forming of a hydrogen ($H_2$) and a carbon from a natural gas may form about 190 kilograms of carbon and about 700 normal cubic meters of $H_2$ from about 350 normal cubic meters of the natural gas. From about 600 kilowatt hour thermal equivalent energy to about 1200 kilowatt hour thermal equivalent energy may be required to pre-heat the iron ore fines as part of the hydrogen direct reduction of iron process. In some embodiments, about 702 $kWh_{Thermal}$ may be required to produce 1 metric ton of steel. From about 200 normal cubic meters to about 400 normal cubic meters of the natural gas may be required to produce about 1 metric ton of the steel. In some embodiments, about 350 normal cubic meters of the natural gas is required to produce about 1 metric ton of the steel. The method may require from about 1,000 kilowatt hours to about 2,000 kilowatt hours of electricity to generate about 1 metric ton of steel. The method may require about 1,415 kilowatt hours of electricity to generate about 1 metric ton of the steel. The furnace may include an electric induction furnace.

The present disclosure may relate to systems for producing a steel. A disclosed system may include a thermal plasma electrolysis system configured to generate a $H_2$ and a carbon from a natural gas. The system may include a hydrogen direct reduction system configured to receive the $H_2$ generated from the thermal plasma electrolysis system and to reduce pre-heated iron ore fines with the $H_2$ to generate briquetted iron of ≥90% iron content. The system may include a furnace. The furnace may be configured to receive the hot iron briquettes and to separate the melted contained iron from the melted residual non-metallic slag contained in the hot iron briquettes. The furnace may be configured to alloy the melted iron with a portion of the carbon to form the steel. The system may require from about 1,000 kilowatt hours to about 2,000 kilowatt hours of electricity to generate about 1 metric ton of steel.

A system may include a furnace that may include an electric induction furnace. The system may produce less than about 0.01 metric tons of $CO_2$ per metric ton of steel produced. The system may be configured to produce the steel having a carbon content ranging from about 0.05 wt. % to 3.0 wt. %, by weight of the steel. A thermal plasma electrolysis system may be configured to about 190 kilograms of carbon and about 700 normal cubic meters of $H_2$ from about 350 normal cubic meters of the natural gas. The system may be configured to produce about 1 metric ton of steel from about 200 normal cubic meters to about 400 normal cubic meters of the natural gas. For pre-heating the iron ore fines, the system may be configured to produce 1 metric ton of steel from about 600 kilowatt hour thermal equivalent energy to about 1200 kilowatt thermal equivalent energy equivalent may be required. In some embodiments, about 702 $kWh_{Thermal}$ may be required to produce 1 metric ton of steel. The system may require about 1,415 kilowatt hours of electricity to generate about 1 metric ton of the steel.

Additional features and advantages of the present disclosure are described in, and will be apparent from, the detailed description of this disclosure

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIG. 1 is a schematic diagram of a process flow for a steel production method, used in accordance with some embodiments.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a method for direct steel (e.g., primary steel) production utilizing an induction furnace (e.g., electrical induction furnace). The steel production method may use electricity, natural gas ($CH_4$), hydrogen ($H_2$), thermal energy, iron ore fines, and 100% by carbon weight (cw) carbon (e.g., carbon black) to produce steel (e.g., carbon steel). Moreover, the method may lower the direct emissions of $CO_2$ at steel plants to either close to or at zero emissions (i.e., undetectable by known measuring instruments). This lowering of the carbon footprint may be due to the steel production method using components that produce either close to or zero emissions of $CO_2$. In particular, disclosed steel production methods does not utilize fossil fuels, such as coal or oil, typically used at steel plants. In addition, existing steel plants may easily be reconfigured to adopt the methods and systems disclosed herein.

Methods for Steel Production

The present disclosure relates to methods for steel (e.g., primary steel) production, as is shown in FIG. 1. FIG. 1 is a schematic diagram of a process flow for a steel production method 100, used in accordance with some embodiments. Note that the quantities described herein for steel production method 100 are being provided as an example. Still, there may be different quantities used or produced by the steel production method 100 in other embodiments compared to those described herein. In this case, the steel production method 100 may require about 1415 kWh of electricity to produce about 1.0 metric ton (Mt) of 1.0% carbon weight steel.

A method for steel (e.g., primary steel) production may produce steel while requiring less energy (e.g., less electricity) in comparison to known methods. For example, the method for steel production may produce about 1 Mt of steel while requiring from about 1,000 kWh to about 2,000 kWh of electricity. The method for steel production 100 may produce about 1 Mt of steel while requiring about 1,000 kWh, or about 1,250 kWh, or about 1,500 kWh, or about 1,750 kWh, or about 2,000 kWh, of electricity, where about includes plus or minus 125 kWh. The disclosed method may produce about 1 Mt of steel while requiring about 1,415 kWh of electricity.

In some embodiments, a disclosed method may include forming a hydrogen ($H_2$) and a carbon from a natural gas ($CH_4$) using a thermal plasma electrolysis (TPE) system 102. The method may including producing from about 600 normal cubic meters ($Nm^3$) to about 800 $Nm^3$ of $H_2$ from about 200 $Nm^3$ to about 400 $Nm^3$ of natural gas. The method may produce about 600 $Nm^3$ of $H_2$, or about 650 $Nm^3$ of $H_2$, or about 700 $Nm^3$ of $H_2$, or about 750 $Nm^3$ of $H_2$, or about 800 $Nm^3$ of $H_2$, from about 200 $Nm^3$ of natural gas, or about 250 $Nm^3$ of natural gas, or about 300 $Nm^3$ of natural gas, or about 350 $Nm^3$ of natural gas, or about 400 $Nm^3$ of natural gas, where about includes plus or minus 25 $Nm^3$. In an example, the TPE 102 may receive about 350 $Nm^3$ of natural gas (e.g., $CH_4$) from a natural gas source, such as an established transmission and distribution network or a liquefied natural gas re-gasification terminal and related at site storage facilities. The TPE system 102 may use electricity to decompose the about 350 $Nm^3$ of natural gas ($CH_4$) into about 190 kg of 100% cw carbon and 700 $Nm^3$ $H_2$. In some embodiments, the TPE system 102 uses exclusively electricity to disassemble natural gas ($CH_4$) into its carbon and hydrogen ($H_2$) components. Also, the TPE system 102 may collectively separate the hydrogen ($H_2$) and carbon components. The carbon components may be 100% cw carbon black. In some embodiments, the TPE may produce about 190 kg of 100% cw carbon black and about 700 $Nm^3$ of $H_2$. The disclosed TPE system 102 may utilize 700 kWh of the 1415 kWh used by steel production method 100 for its operations. A carbon black holding (CBH) 104 may store 190 kg of 100% cw carbon black. The CBH 104 may be a closed container that is clean, dry, and away from exposure to high temperatures, open flame sources, and strong oxidizers (e.g., chlorates, bromates, and nitrates). Moreover, the CBH 104 may be configured so that carbon black does not adsorb moisture and chemical vapors. The disclosed method for producing steel may produce about 1 Mt of steel from about 200 $Nm^3$ to about 400 $Nm^3$ of natural gas. The disclosed method for producing steel may produce about 1 Mt of steel from about 350 $Nm^3$ of natural gas.

As shown in FIG. 1, a method for steel production 100 may include reducing iron ore fines with $H_2$ generated from a thermal plasma electrolysis to form briquetted iron (e.g., hot briquetted iron). In exemplary embodiments, about 700 $Nm^3$ of hydrogen ($H_2$) produced by TPE system 102 may be sent to a hydrogen direct reduction of iron (HDRI) system 106. The HDRI system 106 may also receive iron ore fines to be reduced by $H_2$ to produce briquettes of iron. The HDRI system 106 may use thermal energy to pre-heat the iron ore fines prior to the use of H2 as a reducing agent to remove oxygen from the same iron ore fines to produce briquetted iron. In some embodiments, the HDRI system 106 may use from 600 $kWh_{Thermal}$ to about 800 $kWh_{Thermal}$ when producing briquetted iron. The HDRI system 106 may use about 600 $kWh_{Thermal}$, or about 625 $kWh_{Thermal}$, or about 650 $kWh_{Thermal}$, or about 675 $kWh_{Thermal}$, or about 700 $kWh_{Thermal}$, or about 725 $kWh_{Thermal}$, or about 750 $kWh_{Thermal}$, or about 775 $kWh_{Thermal}$, or about 800 $kWh_{Thermal}$, when producing briquetted iron, where about includes plus or minus 12.5 $kWh_{Thermal}$.

In a disclosed embodiment, the HDRI system 106 may produce about 1100 kg of briquetted iron (e.g., hot briquetted iron) of ≥90% iron content from about 1.65 Mt of pre-heated >65% iron ore fines and 700 $Nm^3$ of $H_2$. In a disclosed embodiment, the HDRI system 106 may produce about 1100 kg of briquetted iron of ≥90% iron content using only about 702 kWh thermal energy equivalent for pre-heating the iron ore fines and 140 kWh of electricity for its overall operations. The output emissions produced by HDRI system 106 may include water.

A method for steel production 100 may include combining a carbon and an iron in a furnace 108 (e.g., electric induction furnace) to form a carbon (e.g., carbon black) and iron mixture. The method 100 may include melting the hot iron briquettes with heat generated from the furnace 108 to produce melted iron and a melted slag. A slag may include one or more of a non-metallic bearing slag and a non-ferrous slag. A slag may include any slag components known in the art, including, but not limited to metal oxides, silicon dioxide, metal sulfides, elemental metals, calcium oxide, magnesium oxide, silicone oxide, aluminum oxide, and mixtures thereof. The method 100 may include separating the slag from the molten iron and transferring the slag from the EIF 108 to a slag collection unit 110. The method 100 may include removing the non-metallic slag from the furnace and alloying the melted iron with a carbon in a furnace 108 to form a steel. The disclosed EIF 108 may send from about 50 kg to about 100 kg of slag from the melted hot iron briquettes to a slag collection unit 110. For example, the EIF 108 may send about 50 kg, or about 60 kg, or about 70 kg, or about 80 kg, or about 90 kg, or about 100 kg, or about 110 kg, or about 120 kg, or about 130 kg, or about 140 kg, or about 150 kg, or about 160 kg, or about 170 kg, or about 180 kg, or about 190 kg, or about 200 kg of slag to a slag collection unit 110. The EIF 108 may send about 110 kg of non-metallic bearing slag to the slag collection unit 110. The slag collection unit 110 may be connected to the EIF 108 through any known mechanical or plumbing means. The slag may be transferred from the EIF 108 to the slag collection unit 110 using any known mechanical means, including conveyors, solid transfer devices, and liquid transfer devices.

A disclosed method may include separating a slag from a molten iron. For example, a method may include separating a non-metallic slag from the molten iron. Separating may include any know means, including, but not limited to tapping the slag off of the molten liquid. A chipping hammer may be used to remove slag from the molten iron. A refractory coated skimming blade may skim a surface of the molten iron to remove slag. A slag agent may be added to the slag and then the slag may be picked up with a rod.

A method may include introducing carbon into a molten iron and alloying the melted iron with the carbon to form a steel. The method may introduce the carbon (e.g., carbon black) to the molten iron in an electric induction furnace (EIF) 108. The electric induction furnace (EIF) 108 may produce about 1.0 Mt of steel using about 990 kg of molten iron derived from the 1100 kg of ≥90% Fe briquetted iron produced by HDRI system 106 and about 10 kg about 100% cw carbon black transferred from CBH 104. It is to be appreciated that the addition of carbon black to molten iron to produce steel using an EIF is a distinguishing feature not done in the prior art. Note that the about 10 kg of about 100% cw carbon black may be an alloying element. The EIF 108 may heat metals at about 1525° C. by electromagnetic induction. In some embodiments, the EIF 108 may heat metals to a temperature ranging from about 1,400° C. to about 1,600° C. by electromagnetic induction. For example, the EIF 108 may heat metals to a temperature of about 1,400° C., or about 1450° C., or about 1,500° C., or about 1,550° C., or about 1,600° C., where about includes plus or minus 25° C. The EIF 108 may allow the introduction of about 10 kg of about 100% cw carbon black to the 990 kg of molten iron remaining in the EIF to bind the carbon to the melted iron to form steel. Using this disclosed arrangement, the EIF 108 may produce about 1.0 metric ton (Mt) of 1.0% cw steel using about 575 kWh of electricity. This steel may later be used in rolling mills or other metallurgic processes. Note that the remaining about 180 kg of about 100% cw carbon black being held in CBH 104 may be applied in different methods. The disclosed EIF 108 may not utilize fossil fuels or natural gas when producing the steel. The disclosed methods may produce nearly zero or zero output emissions of $CO_2$.

In some embodiments, a disclosed method for producing steel 100 may produce about 1 Mt of steel while producing from about 0.0001 metrics tons of $CO_2$ to about 0.1 metric tons of $CO_2$. The method for producing steel 100 may produce about 1 Mt of steel while producing less than about 0.1 metric tons of $CO_2$, or less than about 0.01 metric tons of $CO_2$, or less than about 0.001 metric tons of $CO_2$, or less than about 0.0001 metric tons of $CO_2$, or less than about, where about includes plus or minus 25% of the value in metric tons of $CO_2$. The method for producing steel 100 may produce substantially no $CO_2$ emissions. Substantially no $CO_2$ emissions indicates levels not detectable by known $CO_2$ measuring instruments or what qualifies as no $CO_2$ emissions by a governing or regulatory body (e.g., Environmental Protection Agency).

The disclosed method for producing steel 100 may produce a steel having a carbon content ranging from about 0.05 wt. % carbon to about 3.0 wt. % carbon, by weight of the steel. For example, the method 100 may produce a steel having a carbon content of about 0.05 wt. %, or about 0.25 wt. %, or about 0.5 wt. %, or about 0.75 wt. %, or about 1.0 wt. %, or about 1.25 wt. %, or about 1.5 wt. %, or about 1.75 wt. %, or about 2.0 wt. %, or about 2.5 wt. %, or up to about 3.0 wt. %, where about includes plus or minus 0.125 wt. %, by weight of the steel. Steel produced by disclosed method may include low-carbon steel (up to about 0.3 wt. %), medium carbon steels (0.3-0.6 wt. %), and high carbon steels (more than 0.6 wt. %).

The disclosure describes a steel production method 100 producing zero emissions or close to zero emissions of $CO_2$.

The steel production method may include the following system components: a thermal plasma electrolysis (TPE) system, a hydrogen direct reduction of iron (HDRI) system, and an electric induction furnace (EIF). In disclosed embodiments, the EIF may receive hot iron briquettes produced by the HDRI system and 100% cw carbon black made by the TPE system to produce steel. The steel production method 100 may lower the carbon footprint at steel plants due to using system components that have either close to or zero emissions of $CO_2$. A disclosed method including an EIF using carbon black may advantageously produce steel having close to or zero $CO_2$ emissions. The disclosed method of adding 100% by carbon weight carbon black to melted iron in an electric induction furnace (EIF) in the production of steel has heretofore not been performed in known systems.

A TPE system 102 may produce hydrogen and carbon from natural gas (e.g., methane). The natural gas is decomposed by a plasma produced by the TPE system 102 to form the hydrogen and carbon. The TPE system 102 produces the hydrogen and carbon with relatively little energy input and without producing greenhouse gases including CO2. The TPE system 102 may include a thermal plasma source, a cascaded arc containing multiple electrodes, and a low-pressure deposition chamber. The thermal plasma source may generate a plasma torch, which can be used to ionize the methane, thereby forming hydrogen and carbon. In some embodiments, an HDRI system 106 may produce iron briquettes containing ≥90% iron content from iron ore (e.g., iron ore fines) using a two-stage fluidized bed process with hydrogen as the reducing medium The hydrogen gas may also be produced from one or more renewable energy sources i.e., renewable power and renewable natural gas, from the TPE system 102. In some embodiments, an HDRI system 106 may be a solid-state process that reduces iron oxides to metallic iron at temperatures below the melting point of iron. For example, an HDRI system 106 may heat an iron ore in a furnace at a temperature ranging from 1,470 F to 2,190 F in the presence of hydrogen gas to reduce the iron ore to form the iron metal.

An electric induction furnace (EIF) 108 may include an electrical furnace in which heat is applied by induction heating of a metal. An EIF 108 may include a clean, energy-efficient, and well-controlled melting process, compared to most other means of metal melting. An EIF 108 may include a coreless EIF, where metal may be placed in a crucible surrounded by a water-cooled alternating current solenoid. An EIF 108 may include a channel-type induction furnace having a loop of molten metal, which forms a single-turn secondary winding through an iron core.

A CBH 104 may store carbon (e.g., carbon black) produced by a TPE. The CBH 104 may include one or more containers that are clean, dry, uncontaminated, and are separated from exposure to high temperature, open flame sources, and oxidizers (e.g., chlorates, bromates, nitrates). The CBH 104 may include closed containers that prevent the stored carbon black from absorbing moisture and chemical vapors. The CBH 104 may be directly connected to a TPE 102, and HDRI 106, and an EIF 108 through any known means of connection, including known plumbing fitting and pipes. The CBH 104 may include various mechanical, pneumatic, and electrical means of receiving and transporting carbon black.

In addition, a person having ordinary skill in the art may readily configure existing steel plants to include disclosed steel production system components for running disclosed steel production methods without requiring significant changes. By being configured to include disclosed steel production components, a steel plant may produce steel without utilizing fossil fuels, such as coal or oil, typically used at steel plants.

Systems for Steel Production

In some embodiments, the present disclosure relates to a system for producing steel. The disclosed system for producing steel (e.g., primary steel) may include, but is not limited to, each of the components found in the above-described methods for producing steel. The disclosed system for producing steel may advantageously produce about 1.0 metric ton (Mt) of 1.0% carbon weight steel while requiring about 1415 kWh of electricity. The disclosed system for producing steel may produce about 1 Mt of steel from about 350 $Nm^3$ of natural gas. The disclosed system for producing steel may produce about 1 Mt of steel while producing no $CO_2$ emissions or substantially no $CO_2$ emissions.

A disclosed system may include a thermal plasma electrolysis system configured to generate a $H_2$ and a carbon from a natural gas. The system may include a HDRI system configured to receive the $H_2$ generated from the thermal plasma electrolysis system and to reduce iron ore fines with the $H_2$ to produce iron briquettes (e.g., hot iron briquettes). The system may include a furnace. The furnace may be configured to receive the iron briquettes, melt the iron briquettes, remove melted non-metallic slag, and alloy the residual melted iron with a portion of the carbon to form the steel. The system may require from about 1,000 kilowatt hours to about 2,000 kilowatt hours of electricity to generate about 1 metric ton of steel.

A system may include a furnace that may include an electric induction. The system may produce less than about 0.01 metric tons of $CO_2$ per metric ton of steel produced. The system may be configured to produce the steel having a carbon content ranging from about 0.05 wt. % to 3.0 wt. %, by weight of the steel. A thermal plasma electrolysis system may be configured to about 190 kilograms of carbon and about 700 normal cubic meters of $H_2$ from about 350 normal cubic meters of the natural gas. The system may be configured to produce about 1 metric ton of steel from about 200 normal cubic meters to about 400 normal cubic meters of the natural gas. The system may require about 702 $kWh_{Thermal}$ to pre-heat the iron ore fines prior to utilizing the $H_2$ as a reducing agent to remove the oxygen from the iron ore fines to produce the 1100 kg of hot iron briquettes containing ≥90% iron by content. The system may require about 1415 kilowatt hours of electricity to generate about 1 metric ton of the steel.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A method for steel production, the method comprising:
forming a hydrogen ($H_2$) and a carbon from a natural gas using a thermal plasma electrolysis system;
reducing iron ore fines with the $H_2$ to form an iron briquette;
melting the iron briquette in a furnace to form a molten iron and non-metallic slag;
separating the non-metallic slag from the molten iron;
introducing the carbon into the molten iron; and
alloying the melted iron with the carbon to form a steel.

2. The method according to claim 1, wherein the reducing the iron ore fines is performed with a hydrogen direct reduction system.

3. The method according to claim 1, wherein the carbon is carbon black.

4. The method according to claim 1, wherein the method produces less than about 0.1 metric tons of $CO_2$ per metric ton of steel produced.

5. The method according to claim 1, wherein the method produces less than about 0.001 metric tons of $CO_2$ per metric ton of steel produced.

6. The method according to claim 1, wherein the steel comprises a carbon content ranging from about 0.05 wt. % to 3.0 wt. %, by weight of the steel.

7. The method according to claim 1, wherein the steel comprises a carbon content of about 1.0 wt. %, by weight of the steel.

8. The method according to claim 1, wherein the forming the hydrogen ($H_2$) and the carbon from the natural gas forms about 190 kilograms of carbon and about 700 normal cubic meters of $H_2$ from about 350 normal cubic meters of the natural gas.

9. The method according to claim 1, where from about 200 normal cubic meters to about 400 normal cubic meters of the natural gas is required to produce about 1 metric ton of the steel.

10. The method according to claim 1, wherein about 350 normal cubic meters of the natural gas is required to produce about 1 metric ton of the steel.

11. The method according to claim 1, further comprising pre-heating the iron ore fines, wherein about 702 $kWh_{Thermal}$ is used to pre-heat the iron ore fines.

12. The method according to claim 1, wherein the method requires from about 1,000 kilowatt hours to about 2,000 kilowatt hours of electricity to generate about 1 metric ton of steel.

13. The method according to claim 1, wherein the method requires about 1,415 kilowatt hours of electricity to generate about 1 metric ton of the steel.

14. The method according to claim 1, wherein the furnace comprises an electric induction furnace.

* * * * *